April 22, 1969  J. L. PARK  3,439,923
FACE-TYPE SHAFT SEAL
Filed Nov. 10, 1965
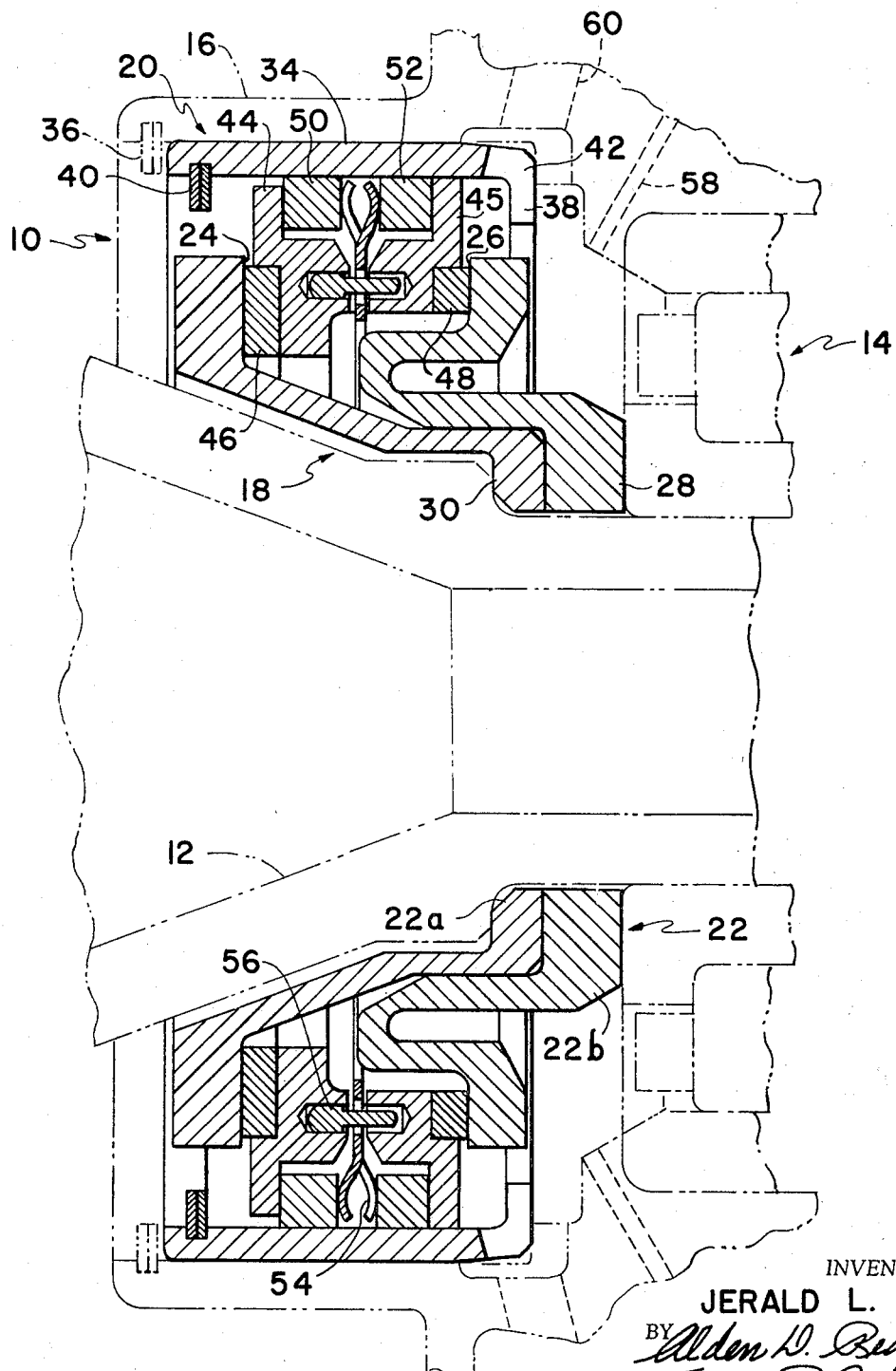
INVENTOR.
JERALD L. PARK
BY Alden D. Redfield
Irwin P. Garfinkle
ATTORNEYS.

United States Patent Office 3,439,923
Patented Apr. 22, 1969

3,439,923
FACE-TYPE SHAFT SEAL
Jerald L. Park, Stratford, Conn., assignor to Avco Corporation, Stratford, Conn., a corporation of Delaware
Filed Nov. 10, 1965, Ser. No. 507,208
Int. Cl. F16j 9/00, 15/00; F16k 41/00
U.S. Cl. 277—62                                  1 Claim

ABSTRACT OF THE DISCLOSURE

The disclosure illustrates a face-type shaft seal having a rotor portion with opposed parallel sealing surfaces and a stator portion including an annular sealing surface fixed relative to the opposed parallel surfaces. A thrust ring and seal ring are positioned between the opposed parallel faces and are urged into engagement therewith by an annular finger spring. A pair of piston-type seal rings are positioned against shoulders of the thrust and seal rings and against the annular sealing surfaces so that the coefficient of friction therebetween is sufficient to restrain rotational movement of the thrust and seal rings relative to the annular sealing surfaces and to permit substantial axial movement.

---

This invention relates to a face-type shaft seal which permits relative motion between the shaft and the shaft housing, while at the same time assuring a constant seal face contact pressure.

The invention finds particular utility as a seal for the main shaft of a high speed gas turbine engine where large axial motion exists between the rotating shaft and the stationary housing. Because of the large axial motion, conventional face-type seals must be made relatively long in the axial direction so that a desired seal face contact pressure can be maintained regardless of the relative axial positions of the shaft and the housing. Moreover, a positive drive between the shaft and seal is not permitted by the prior art where axial freedom is accomplished. By means of this invention a constant seal face loading in maintained by means of a seal with a minimum axial dimension and, in addition, a positive drive is established between the shaft and the rotor of the seal.

It is an object of this invention to provide a face-type seal in which all primary sealing elements are axially movable in such manner that constant seal face contact pressure is maintained regardless of the axial position of the rotating shaft relative to the stationary shaft housing.

Another object of this invention is to positively angularly fix the rotor of a face-type seal to a rotating shaft and to permit axial motion of the shaft with respect to its housing, while at the same time maintaining a constant loading on the seal faces.

Still another object of this invention is to provide a seal in which the pressure on the seal faces is maintained relatively constant by means of a spring contained between elements which are angularly and axially fixed with respect to the shaft.

For further objects and for a better understanding of the invention, reference should now be made to the following detailed specification and to the accompanying drawing in which the single figure shows a seal in accordance with this invention as installed between the shaft and housing of a gas turbine engine.

Referring to the figure, the seal, generally indicated at 10, is shown installed between a hollow shaft 12 of a gas turbine engine 14 and the circular opening in engine housing 16 through which the shaft extends. The purpose of the seal 10 is to prevent the flow of oil from the engine 14 between the shaft and housing.

The seal 10 is provided with a rotor, generally indicated at 18, and a stator, generally indicated at 20. The rotor portion of the seal consists of a hub 22 made up of two annular rotor rings 22a and 22b which together provide two spaced annular parallel faces, a thrust bearing face 24 and a seal face 26. The shouldered portions of the hub 22 adjacent to the shaft 12 are positively clamped between a shoulder 28 on the engine 14 and a shoulder 30 on the shaft so that the hub 22, when installed on the shaft, is axially and angularly fixed with respect thereto. While the means for clamping the hub is not shown, in practice it involves the tying in of the shaft 12 to the engine 14. The shoulders 28 and 30, as well as the adjacent portions of the hub 22, are precisely machined so that an effective static seal between these elements is achieved.

The stator 20 consists of an annular exterior casing 34 which is force-fitted into the housing 16 and maintained in place by means of a snap ring 36. The casing is provided with a flange 38 at one end for limiting the axial movement of the various housing elements in one direction and is provided with snap rings 40 for limiting the axial movement in the opposite direction. The flange 38 is provided with slots 42 for permitting the circulation of oil into and out from the casing.

The stator also includes an annular thrust ring 44 and an annular seal ring 45 housed within the casing 34 and positioned between the thrust bearing face 24 and the seal face 26. The thrust ring 44 carries a thrust bearing element 46 which is in running contact with the thrust bearing face 24, while the seal ring 45 carries a seal element 48, which is in running contact with the seal face 26. The thrust bearing element 46 and the seal element 48 are bonded by any suitable means to the rings 44 and 45, respectively. These elements may be made of carbon or any other suitable material for the purpose.

Conventional piston-type sealing rings 50 and 52, made of segmented steel or other suitable material, with overlapping ends are maintained under radial compression within the housing by their own spring forces and under axial compression against the rings 44 and 45 by means of an annular finger spring 54. The piston-type rings 50 and 52 provide a static seal between the casing 34 and the rings 44 and 45. The finger-type annular spring 54 is constrained from rotation by means of one or more pins 56.

Lubrication oil is admitted at a port 58 and is scavenged through a port 60.

It will be noted that all of the sealing elements, except for the casing 20, are maintained in a fixed space relationship between the rings of the hub 22. It is also pointed out that the hub 22 is positively coupled to the shaft 12 and driven thereby. It is known that in a gas turbine engine a large axial motion exists between the rotating shaft and the stationary housing. Such axial motion is permitted by the disclosed seal 10 since all of the seal elements are axially movable along with the shaft within the casing 20. The only limitation on the degree of axial motion is imposed by the placement of the snap ring 40. If a larger axial motion is required, casing 20 can be lengthened and the snap ring 40 appropriately placed.

In addition to permitting extended axial movement between the shaft and the housing, the novel seal permits this movement while at the same time maintaining a constant spring pressure on the various seal and thrust bearing faces. That is to say, since the rotor rings 22a and 22b have a fixed spacing, the spacing of the elements therebetween is also fixed and the pressure on the spring 54 is maintained constant. It will also be noted that this effect has been produced while at the same time having a positive drive between the seal 10 and the shaft 12. Thus, in accordance with this invention, all primary seal elements are axially movable in such a manner that constant seal face contact pressure, due to the spring forces, is maintained constant regardless of the axial position of the rotating shaft relative to the stationary housing. This constant pressure results by containing the spring forces between rotating elements which are positively coupled to the shaft and hence which do not change in axial position relative to one another.

When the disclosed seal is installed in a gas turbine engine, the thrust bearing side of the seal, that is the side adjacent the snap ring 40, serves as a dam or barrier to retard heat radiation from hot air which exists on the dry side of the seal.

It will be obvious to persons skilled in the art that this invention is susceptible to various modifications and adaptations, and it is intended therefore that the invention be limited only by the following claim as interpreted in the light of the prior art.

What is claimed is:

1. A face-type dynamic seal for sealing the space between a rotating shaft and a circular aperture in a stationary housing, the combination comprising:

a rotor positively fixed both axially and angularly to said shaft in static sealing relationship thereto, said rotor having two spaced annular, radially extending, opposed parallel faces;

a stator comprising an annular casing positioned in and fixed relative to said aperture, said annular casing having an inner annular imperforate surface extending between and having an axial dimension greater than the distance between said opposed parallel faces, an annular thrust ring and an annular seal ring positioned between said opposed parallel faces, said thrust ring and said seal ring each having a face contacting one of said opposed parallel faces in dynamic sealing relation thereto, said thrust ring and said seal ring each having a peripheral shoulder;

first and second segmented piston-type sealing rings radially compressed within the inner annular imperforate surface of said casing for providing an angularly static, axially dynamic seal between said piston-type sealing rings and said annular casing;

an axially expansible finger spring positioned between said first and second piston-type rings and radially inward of said annular imperforate surface, said finger spring urging said piston rings against the opposed peripheral shoulders of said seal ring and said thrust ring with a predetermined contact pressure, thereby providing an angularly static and axially dynamic seal between said seal ring and thrust ring and said casing;

means positioned at opposite ends of said annular sealing surface for positively limiting the axial motion of said thrust ring and said seal ring with respect to said casing; and pin means extending into and between said seal and thrust rings and through a hole in said finger spring for rotatably restraining said spring means and said thrust and seal rings relative to one another.

References Cited

UNITED STATES PATENTS

| | | | |
|---|---|---|---|
| 1,505,321 | 8/1924 | Dennedy | 277—62 |
| 2,215,034 | 9/1940 | Gorman | 277—62 |
| 2,326,489 | 8/1943 | Payne | 277—86 |
| 1,871,299 | 8/1932 | Bragg et al. | 277—95 X |

FOREIGN PATENTS

| | | |
|---|---|---|
| 649,171 | 9/1962 | Canada. |
| 905,084 | 2/1954 | Germany. |

SAMUEL ROTHBERG, *Primary Examiner.*

JEFFREY S. MEDNICK, *Assistant Examiner.*

U.S. Cl. X.R.

277—65, 86